(12) United States Patent
Lam

(10) Patent No.: US 7,418,013 B2
(45) Date of Patent: Aug. 26, 2008

(54) TECHNIQUES TO SYNCHRONIZE PACKET RATE IN VOICE OVER PACKET NETWORKS

(75) Inventor: Siu H. Lam, WoodCliff Lake, NJ (US)

(73) Assignee: Intel Corporation, Santa Clara, CA (US)

( * ) Notice: Subject to any disclaimer, the term of this patent is extended or adjusted under 35 U.S.C. 154(b) by 885 days.

(21) Appl. No.: 10/947,889

(22) Filed: Sep. 22, 2004

(65) Prior Publication Data

US 2006/0062215 A1    Mar. 23, 2006

(51) Int. Cl.
*H04J 3/06*    (2006.01)

(52) U.S. Cl. .................................................... 370/516

(58) Field of Classification Search ........... None
See application file for complete search history.

(56) References Cited

U.S. PATENT DOCUMENTS

| | | | |
|---|---|---|---|
| 5,668,925 A * | 9/1997 | Rothweiler et al. | 704/220 |
| 6,804,203 B1 * | 10/2004 | Benyassine et al. | 370/286 |
| 7,099,820 B1 * | 8/2006 | Huart et al. | 370/252 |
| 7,212,517 B2 * | 5/2007 | Dzik | 370/352 |
| 7,246,057 B1 * | 7/2007 | Sundqvist et al. | 704/219 |
| 7,319,703 B2 * | 1/2008 | Lakaniemi et al. | 370/505 |
| 2002/0184009 A1 * | 12/2002 | Heikkinen | 704/219 |
| 2003/0179757 A1 * | 9/2003 | Ten Kate et al. | 370/395.61 |
| 2004/0120309 A1 * | 6/2004 | Kurittu et al. | 370/352 |

* cited by examiner

*Primary Examiner*—Anh-Vu H Ly
(74) *Attorney, Agent, or Firm*—Kacvinsky LLC

(57) ABSTRACT

Method and apparatus to synchronize packet rate for audio information are described.

20 Claims, 7 Drawing Sheets

TECHNIQUES TO SYNCHRONIZE PACKET RATE IN VOICE OVER PACKET NETWORKS

BACKGROUND

A Voice Over Packet (VOP) system may communicate audio information over a packet network as a stream of audio packets. An example of audio information may be information from a telephone call. Information from a telephone call may follow a certain temporal pattern. The temporal pattern may be disrupted, however, as audio packets travel through the packet network, or because of clock differentials between a transmit clock and a receive clock. Disruption of the temporal pattern may degrade the quality of the telephone call. Consequently, there may be need for improved techniques to recover the temporal pattern of an audio packet stream in a device or network.

DETAILED DESCRIPTION

Figure 1:
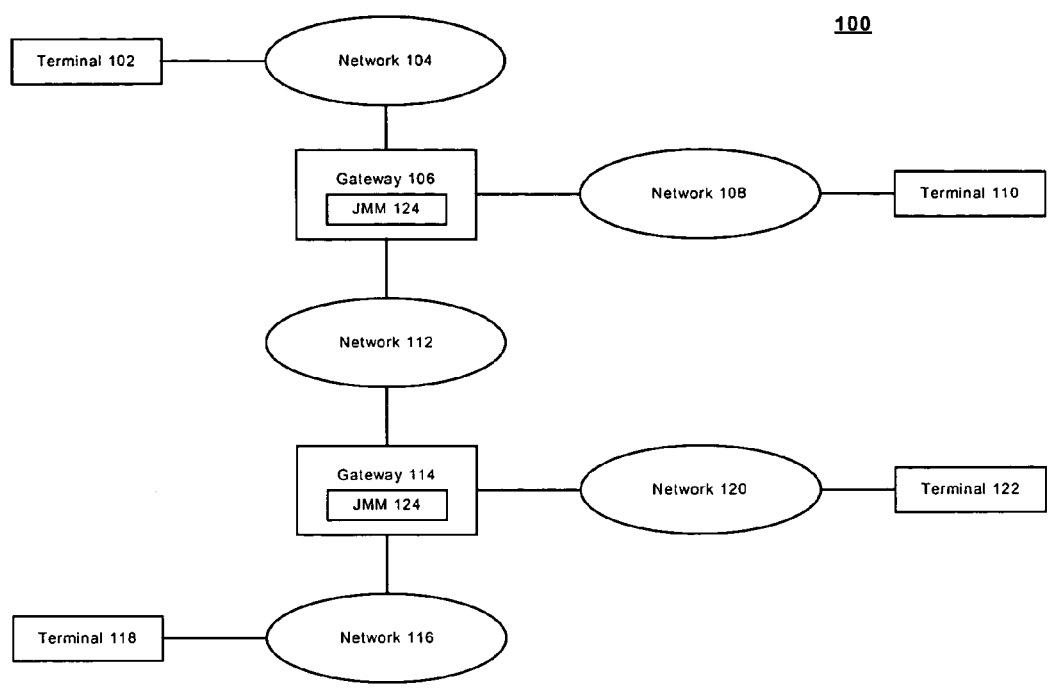
FIG. 1 illustrates a block diagram of a network 100.

FIG. 1 illustrates a block diagram of a network 100. Network 100 may comprise, for example, a communication system having multiple nodes. A node may comprise any physical or logical entity having a unique address in network 100. Examples of a node may include, but are not necessarily limited to, a computer, server, workstation, laptop, ultra-laptop, handheld computer, telephone, cellular telephone, personal digital assistant (PDA), router, switch, bridge, hub, gateway, wireless access point (WAP), and so forth. The unique address may comprise, for example, a network address such as an Internet Protocol (IP) address, a device address such as a Media Access Control (MAC) address, and so forth. The embodiments are not limited in this context.

The nodes of network 100 may be connected by one or more types of communications media and input/output (I/O) adapters. The communications media may comprise any media capable of carrying information signals. Examples of communications media may include metal leads, printed circuit boards (PCB), backplanes, switch fabric, semiconductor material, twisted-pair wire, co-axial cable, fiber optics, radio frequency (RF) spectrum, and so forth. An information signal may refer to a signal which has been coded with information. The I/O adapters may be arranged to operate with any suitable technique for controlling information signals between nodes using a desired set of communications protocols, services or operating procedures. The I/O adapters may also include the appropriate physical connectors to connect the I/O adapters with a corresponding communications media. Examples of an I/O adapter may include a network interface, a network interface card (NIC), radio/air interface, disc controllers, video controllers, audio controllers, and so forth. The embodiments are not limited in this context.

The nodes of network 100 may be configured to communicate different types of information, such as media information and control information. Media information may refer to any data representing content meant for a user, such as video information, audio information, text information, alphanumeric symbols, graphics, images, and so forth. Audio information may include data communicated during a telephone call, such as voice or speech, speech utterances, silent periods, background noise, comfort noise, tones, music, and so forth. Control information may refer to any data representing commands, instructions or control words meant for an automated system. For example, control information may be used to route media information through a system, or instruct a node to process the media information in a predetermined manner.

The nodes of network 100 may communicate media and control information in accordance with one or more protocols. A protocol may comprise a set of predefined rules or instructions to control how the nodes communicate information between each other. The protocol may be defined by one or more protocol standards as promulgated by a standards organization, such as the Internet Engineering Task Force (IETF), International Telecommunications Union (ITU), the Institute of Electrical and Electronics Engineers (IEEE), and so forth.

Referring again to FIG. 1, network 100 may comprise a VOP network to communicate voice information over a packet network. Although FIG. 1 is shown with a limited number of nodes in a certain topology, it may be appreciated that network 100 may include more or less nodes in any type of topology as desired for a given implementation. The embodiments are not limited in this context.

As shown in FIG. 1, network 100 may include network nodes 102, 110, 118 and 122. In one embodiment, for example, network nodes 102, 110, 118 and 122 may be implemented as call terminals. A call terminal may comprise any device capable of communicating audio information, such as a telephone, a packet telephone, a mobile or cellular telephone, a processing system equipped with a modem or Network Interface Card (NIC), and so forth. In one embodiment, the call terminals may have a microphone to receive analog voice signals from a user, and a speaker to reproduce analog voice signals received from another call terminal.

Network 100 may also include various types of networks, such as networks 104, 108, 112, 116 and 120. The networks may include voice networks and packet networks.

In one embodiment, for example, networks 104 and 116 may be voice networks. An example of a voice network may include a circuit-switched network, such as the Public Switched Telephone Network (PSTN). A circuit-switched network typically establishes a dedicated communications channel or circuit between call terminals.

In one embodiment, for example, networks 108, 112 and 120 may be data networks. An example of a data network may include a packet network, such as the Internet. A packet network may comprise one or more network nodes that communicate information as a stream of relatively short packets. A packet in this context may refer to a set of information of a limited length, with the length typically represented in terms of bits or bytes. In general operation, a network node may receive the audio information, and break it up into a series of audio packets. Each packet may comprise a portion of the audio information and control information. The network node may then send the audio packets in sequence to another network node. This process may be repeated until the entire series of packets exit the network or reaches their intended destination.

Each network in network 100 may communicate audio packets in accordance with one or more communications protocols. In one embodiment, for example, networks 108, 112 and 120 may operate in accordance with, for example, one or more Internet protocols. Further, packet networks 108, 112, and 120 may also include the appropriate interfaces to circuit-switched networks such as networks 104 and 116, and vice-versa.

In one embodiment, network 100 may further comprise network nodes 106 and 114. In one embodiment, networks node 106 and 114 may comprise gateways or media gateways. Media gateways 106 and 114 may operate to convert a conventional telephony call to a packet telephony call or VOP call. For example, media gateways 106 and 114 may receive signals from a circuit-switched network, such as networks 104 and 116, and convert the circuit-switched signals into packets. The conversion to packets may be made in accordance with any number of VOP protocols, such as the Real-Time Transport Protocol (RTP), the Session Initiation Protocol (SIP), the H.323 protocol, the Megaco protocol, and so forth. Media gateways 106 and 114 may also receive signals from a packet network, such as networks 108, 112 and 120, and convert the packets into circuit-switched signals or pass them to another packet network.

Network 100 may complete a telephone call between call terminals, such as call terminals 102, 110, 118 and 122. The communication path between certain call terminals may comprise both circuit-switched networks and packet networks, as demonstrated by a telephone call between call terminals 102 and 118, for example. The communication path between certain call terminals may comprise only packet networks, as demonstrated by a telephone call between call terminals 110 and 122, for example. In both cases, a portion of the communication path traverses a packet network. Completing a telephone call over a packet network may introduce the problems with network delay and clock differentials as described previously.

In general operation, assume call terminal 102 dials the telephone number for call terminal 118. Network 104 receives the telephone number and initiates a call connection. After a call connection is set-up, call terminal 102 may begin communicating audio information over network 104 to gateway 106. Gateway 106 may convert the audio information represented as circuit-switched signals into packets for transport over network 112. An example of signals communicated via a circuit-switched network may comprise Pulse Code Modulation (PCM) signals. Gateway 114 may receive the packets, often out of order due to the varying network delays experienced by the different packets, and reassembles them as they are received. The packets are then converted back to audio information represented as PCM signals, and the circuit-switched signals are conveyed through network 116 to call terminal 118.

In one embodiment, a telephone call similar to above may be completed without any portion of the audio information traveling over a circuit-switched network such as networks 104 and 116. For example, call terminal 110 may communicate audio information over a call connection with call terminal 122. Call terminal 110 may convert the analog audio signals into digital audio information, and place the audio information into packets. The packets may pass through networks 108, 112 and 120, until they reach call terminal 122. Call terminal 122 may reconstruct the audio information in the form of analog audio signals for conveyance to the listening party. In this case, the embodiments may be implemented in call terminals 110 and 122, for example.

One problem associated with VOP telephone calls may be resolving temporal issues typically associated with packet networks. A telephone conversation follows a certain temporal pattern. The term "temporal pattern" as used herein may refer to the timing pattern of a conventional speech conversation between multiple parties, or one party and an automated system such as an Interactive Voice Response (IVR) system. Disruptions to the temporal pattern may result in an undesirable experience for the participants in the telephone conversation, such as unnatural pauses, stutters, partial words, differences in pitch and tones, and so forth.

One source of such disruptions may be time differences between various clocks used in network 100. In VOP telephony applications, voice is transmitted in data packets at a predetermined frame rate. For example, the predetermined frame rate may be 10 milliseconds (ms). This nominal packet rate can have slight variations between the transmit and receive ends if the clocks at the two ends are not synchronized. The slight packet rate mismatches between endpoints can cause periodic disruptions in the regeneration of the voice signal from packet data. For example, if the receive clock rate is slightly slower than the transmit clock rate, a voice packet may need to be dropped periodically. In another example, if the receive clock rate is slightly higher than the transmit clock rate, a previous voice packet may need to be replayed to bridge a packet gap. This may be described in more detail with reference to FIGS. 2A and 2B.

Figure 2A:
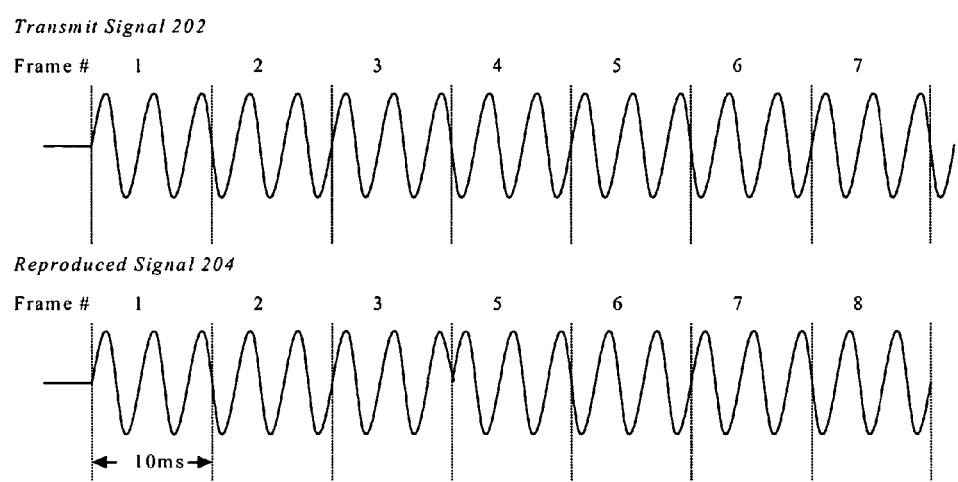
FIG. 2A illustrates a first example of a signal discontinuity.
Figure 2B:
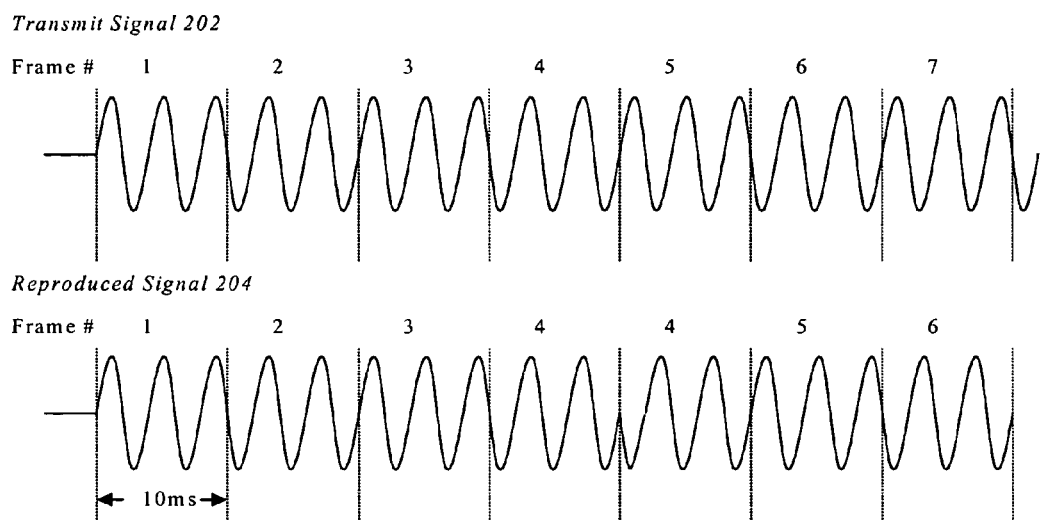
FIG. 2B illustrates a second example of a signal discontinuity.

FIGS. 2A and 2B may illustrate examples of signal discontinuities. A signal discontinuity may occur when a packet is dropped or replayed, since the voice pitch is not synchronous with the packet data rate. This is audible as a periodic disruption in the regenerated voice. With the increasing use of low-cost endpoints, such as Internet Protocol (IP) phones and residential VOP gateways in the commercial market place, the trend is for larger packet rate mismatches thus increasing the potential problem. The frequency of the disruptions can be reduced by using more accurate and stable clocks, or by some mechanism of synchronizing the clocks. Both solutions, however, can add significant cost and complexity to VOP network 100.

FIG. 2A illustrates a first example of a signal discontinuity. FIG. 2A illustrates a transmitted signal 202 and a reproduced signal 204. Each signal may have 7 frames, with each frame having 10 ms of audio information. Assume transmitted signal 202 originates from a first call terminal, such as terminal 110. Further assume transmitted signal 202 is received at a second call terminal, such as terminal 122. Terminals 110 and 122 may each use a different clock with slightly different clock rates. If the receive clock used by terminal 122 is slower than the transmit clock used by terminal 110, one or more frames of audio information may need to be dropped from reproduced signal 204. In this example, Frame 4 is dropped by reproduced signal 204 to compensate for faster inputs received from transmitted signal 202. Frames 3 and 5 may be spliced together to account for dropped Frame 4.

FIG. 2B illustrates a second example of a signal discontinuity. FIG. 2B also illustrates transmitted signal 202 and reproduced signal 204. In this example, assume that the receive clock used by terminal 122 is faster than the transmit clock used by terminal 110. In this case, one or more frames of audio information may need to be replayed in reproduced signal 204. As shown in FIG. 2B, Frame 4 may be replayed in reproduced signal 204 to compensate for slower inputs received from transmitted signal 202. Original Frame 4 and replayed Frame 4 may be spliced together to account for the extra frame.

As shown in FIGS. 2A and 2B, clock differences between the transmit clock and the receive clock may cause frames to be spliced together. The spliced frames, however, may not match at one of the frame boundaries since the pitch period is not synchronous with the frame size. The pitch period may refer to the smallest repeating unit of a signal. This may create a discontinuity in the pitch and degrade a voice conversation, thereby creating an undesirable experience for both participants in the VOP telephone call.

Network 100 may compensate for this and other problems by implementing techniques to compensate for packet rate mismatches. More particularly, one or more network nodes of network 100 may include a Jitter Management Module (JMM). For example, gateways 106 and 114 may each include a JMM 124. JMM 124 may be arranged to dynamically adjust a delay buffer to provide an optimal match in splicing signal frames or fragments together either from dropping or replaying a frame due to packet rate mismatches in the transmit and receive end points.

It is worthy to note that although JMM 124 is shown in FIG. 1 as part of gateways 106 and 114, it can be appreciated that JMM 124 can be implemented in any device connected to network 100, and still fall within the scope of the embodiments. For example, in the case of completing a telephone call between call terminals 110 and 122, JMM 124 may be implemented in call terminals 110 and 122 instead of gateways 106 and 114, respectively, as desired for a particular implementation. The embodiments are not limited in this context.

Figure 3:
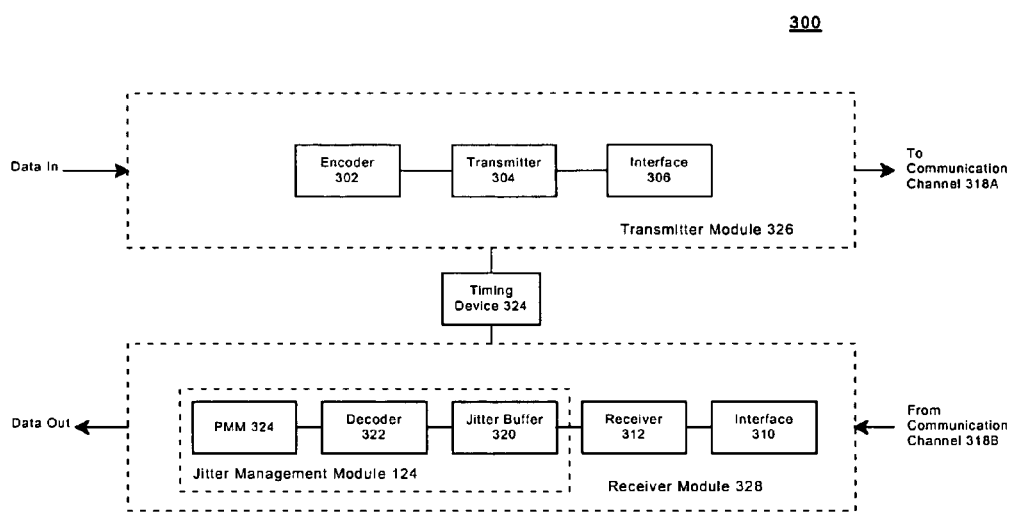
FIG. 3 illustrates a network node 300.

FIG. 3 illustrates a block diagram of a network node 300. Network node 300 may illustrate a portion of a network node as described with reference to FIG. 1. For example, network node 300 may illustrate a portion of a network node such as gateways 106 and/or 114. As shown in FIG. 3, network node 300 may comprise multiple elements. Some elements may be implemented using, for example, one or more circuits, components, registers, processors, software subroutines, or any combination thereof. Although FIG. 3 shows a limited number of elements, it can be appreciated that more or less elements may be used in network node 300 as desired for a given implementation. The embodiments are not limited in this context.

In one embodiment, network node 300 may comprise a transmitter module 326 and a receiver module 328. Transmitter module 326 may transmit audio packets over a packet network. Receiver module 328 may receive audio packets over a packet switched network. An example of packet networks may be networks 108, 112 and 120 of network 100, as represented by communications channels 318A and 318B.

In one embodiment, transmitter module 326 may include an encoder 302. Encoder 302 may compress the audio information to reduce the number of bits needed to represent the audio information. The encoder may be any type of voice coder, such as a G.726 Adaptive Differential Pulse Code Modulation (ADPCM) coder, a G.728 Low Delay Code-Book Excited Linear Predictive (LD-CELP) coder, G.729 Conjugate-Structure Algebraic Code-Book Excited Linear Predictive coder (CS-ACELP), G.723.1 Multi Rate Coder, and so forth. The embodiments are not limited in this context.

In one embodiment, transmitter module 326 may include a transmitter 304. Depending upon the physical transmission technique utilized, transmitter 304 may implement any one or more modulation techniques known in the art, such as phase shift keying (PSK), frequency shift keying (FSK), and so forth. The embodiments are not limited in this context. Transmitter 304 may transmit encoded packets to the packet network via a transmit interface 306. Transmitter interface 306 may represent, for example, the physical or logical connections to the packet network as represented by communications channels 318A and 318B. During the transmission process, each packet is time stamped using a time generated by timing device 324. The time stamped packets are then sent in sequence over transmit interface 306 to the packet network represented as communications channel 318A.

In one embodiment, receiver module 328 may include a receive interface 310 and receiver 312. Receive interface 310 may represent, for example, the physical or logical connections to the packet network represented by communications channel 318B. Receiver 312 may receive the encoded and modulated audio packets from communications channel 318B, and demodulates such information. Again, depending upon the physical transmission technique utilized, receiver 312 may implement any one or more demodulation techniques known in the art, such as PSK, FSK and so forth. The embodiments are not limited in this context.

In one embodiment, receiver module 328 may include JMM 124. As described with reference to FIG. 1, JMM 124 may be arranged to dynamically adjust a delay buffer to provide an optimal match in splicing signal frames or fragments together either from dropping or replaying a frame due to packet rate mismatches in the transmit and receive end points. JMM 124 may include a delay buffer before the regenerated signal is output. This delay is adjusted when a packet needs to be dropped or replayed to allow the resulting splice to be pitch synchronous. This may reduce or eliminate the pitch discontinuity and improve listening voice quality.

In one embodiment, JMM 124 may include a jitter buffer 320. Jitter buffer 320 may compensate for packets having varying amounts of network latency as they arrive at a receiver. A transmitter typically sends audio information in sequential packets to the receiver. The packets may take different paths through the network, or may be randomly delayed along the same path due to changing network conditions. As a result, the sequential packets may arrive at the receiver at different times and often out of order. This may affect the temporal pattern of the audio information as it is played out to the listener. A jitter buffer attempts to compensate for the effects of network latency by adding a certain amount of delay to each packet prior to sending them to a voice coder/decoder ("codec"). The added delay gives the receiver time to place the packets in the proper sequence, and also to smooth out gaps between packets to maintain the original temporal pattern. The amount of delay added to each packet may vary according to a given jitter buffer delay algorithm. The embodiments are not limited in this context.

In one embodiment, JMM 124 may include a decoder 322. Decoder 322 may correspond to encoder 302 used by transmitter module 326 to encode the audio information. Decoder 322 may receive encoded audio information from jitter buffer 320, and decode the encoded audio information into decoded audio information. The decoded audio information may be output to a Pitch Management Module (PMM) 324.

In one embodiment, JMM 124 may include PMM 324. PMM 324 may synchronize a pitch period for a frame or multiple frames with a frame rate. As discussed previously with reference to FIGS. 2A and 2B, clock differences between the transmit clock and the receive clock may cause frames to be spliced together. The spliced frames, however, may not match at one of the frame boundaries since the pitch period is not synchronous with the frame size. The resulting splice may create a discontinuity in the pitch. PMM 324 may assist in reducing or removing this discontinuity, thereby improving the quality of a VOP telephone call. JMM 124 in general, and PMM 324 in particularly, may be described in more detail with reference to FIGS. 4-6.

In general operation, assume call terminal 102 places a telephone call to call terminal 118. The analog audio information may be sent over network 104 to gateway 106. Gateway 106 may convert the PCM signals conveyed by network 104 into packets appropriate for packet network 112. Transmitter module 326 of gateway 106 may encode and transmit the packets over network 112. Further, the packets may be time stamped using timing signals from timing device 324 of gateway 106. Gateway 114 may receive the encoded audio packets from gateway 106 from network 112. Receiver module 328 of gateway 114 may receive the encoded audio packets with varying amounts of network latency. JMM 124 of receiver module 328 may compensate for clock differentials and any network latency accrued during communication of the packets to recover the temporal pattern of the original audio information. The decoded audio packets may be converted back to PCM signals, and sent over network 116 to call terminal 118. The PCM signals may be played out for the listener of call terminal 118.

Figure 4:
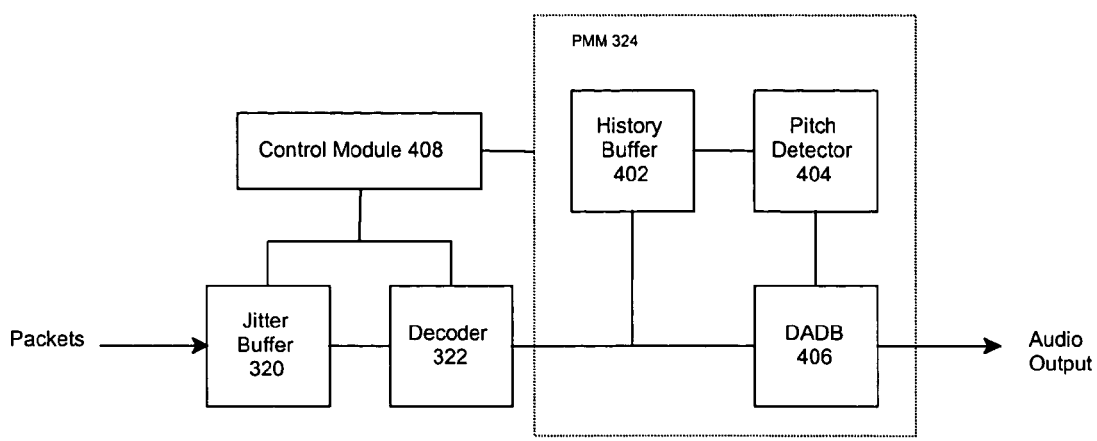
FIG. 4 illustrates a Jitter Management Module (JMM) 124.

FIG. 4 illustrates a more detailed block diagram for JMM 124. As shown in FIG. 4, JMM 124 may include jitter buffer 320, decoder 322, a pitch control module 408, and PMM 324. PMM 324 may include a history buffer 402, a pitch detector 404, and a dynamic adjustable delay buffer (DADB) 406. As with network node 300, JMM 124 may comprise multiple elements implemented using, for example, one or more circuits, components, registers, processors, software subroutines, or any combination thereof. Although FIG. 4 shows a limited number of elements, it can be appreciated that more or less elements may be used in JMM 124 as desired for a given implementation. The embodiments are not limited in this context.

In one embodiment, JMM 124 may include jitter buffer 320 and decoder 322. Jitter buffer 320 may receive packets from receiver 312, and compensate for the effects of network latency by adding a certain amount of delay to each packet prior to sending them to decoder 322. The added delay gives receiver module 328 sufficient time to place the packets in the proper sequence, and also to smooth out gaps between packets to maintain the original temporal pattern. Decoder 322 decodes audio information from the packets, and outputs the audio information to PMM 324.

In one embodiment, PMM 324 may include history buffer 402. History buffer 402 may be used to store one or more previously reproduced frames of audio information received from decoder 322. The stored frames may be used to detect a pitch period by pitch detector 404. The stored frames may also be used to replay one or more frames in the event that the receive clock rate is faster than the transmit clock rate. The number of previously reproduced frames of audio information stored in history buffer 402 may vary according to a number of factors, such as the size of the frames, the pitch range for a human voice, memory resources, operating speeds, and a so forth. For example, assuming a frame size of 10 ms and a pitch range of 50 Hertz (Hz) to 500 Hz, history buffer 402 may be arranged to store approximately 2-20 ms of previously reproduced audio information. The amount of previously reproduced audio information stored in history buffer 402 may vary according to a given implementation, and the embodiments are not limited in this context.

In one embodiment, PMM 324 may include pitch detector 404. Pitch detector 404 may be arranged to detect the pitch of the last frame being played before the packet to be dropped or replayed. The output of pitch detector 404 may determine the amount of samples to be dropped or replayed. Pitch detector 404 does not necessarily need to be operated on a continuous basis. For example, pitch detector 404 may be activated only when a packet needs to be dropped or replayed, thus reducing the average overhead (e.g., power consumption, die space, processing cycles) to JMM 124. The embodiments are not limited in this context.

In one embodiment, PMM 324 may include DADB 406. DADB 406 may comprise a delay buffer to store audio information prior to being reproduced for a listener. DADB 406 may receive additional amounts of audio information in addition to the next frame to be output, thereby assisting in synchronizing a pitch between frames in a given frame sequence. The amount of audio information stored in DADB 406 may be determined using the pitch period generated by pitch detector 404, as discussed in more detail below. The contents of DADB 406 may be output to the audio reproduction elements.

In one embodiment, JMM 124 may include pitch control module 408. Pitch control module 408 may perform various control operations for PMM 324. For example, pitch control module 408 may add audio information to DADB 406 to synchronize a pitch for a next frame and a previously reproduced frame. Pitch control module 408 may compare a number of packets stored in jitter buffer 320 to a minimum threshold value and a maximum threshold value. Pitch control module 408 may generate a first signal to indicate a packet needs removal (e.g., dropped) from jitter buffer 320 if the number of packets is equal to or less than the minimum threshold value. The minimum threshold value may indicate when the jitter buffer has a low number of packets (e.g., an underflow condition) thereby indicating that the receive clock is faster than the transmit clock. Pitch control module 408 may generate a second signal to indicate a reproduced frame needs replayed if the number of packets is equal to or more than the maximum threshold value. The maximum threshold value may indicate when the jitter buffer has too many packets (e.g., an overflow condition) thereby indicating that the receive clock is slower than the transmit clock. The minimum and maximum threshold values may vary according to implementation, and the embodiments are not limited in this context.

In general operation, jitter buffer 320 is used to buffer input packets. If too many packets are accumulated in jitter buffer 320, this may indicate that the receive clock is slower than the transmit clock, and one or more packets may need to be dropped. When no packet is available in jitter buffer 320 when decoder 322 needs it, this may indicate that the receive clock is faster than the transmit clock, and one or more packets may need to be replayed. It is worthy to note that a packet loss in network 100 can also create this latter condition. A packet loss recovery mechanism may be implemented similar to PMM 324. DADB 406, however, does not necessarily need to be adjusted. This condition can be distinguished by checking the following packet to see if the sequence number or timestamp is contiguous.

When a packet needs to be dropped because of frame rate mismatches, the actual amount of voice samples dropped is to be multiples of the pitch period to make the dropped amount be pitch synchronous. If the pitch period is greater than the sum of the data in DADB 406 and a frame, more than one frame may need to be dropped. The data in the number of frames dropped that is in excess of the pitch period, or multiples thereof, are added to the end of DADB 406. This excess data can be taken from the beginning of the first dropped frame, or the end of the last dropped frame, since the data dropped is pitch synchronous. The delay is adjusted according to the amount of data added to DADB 406. If data needs to be taken from DADB 406 to add to the dropped frame(s) to make the amount of samples dropped be pitch synchronous, the delay is also adjusted accordingly.

A similar decision process occurs when a packet needs to be replayed. Integral pitch periods may be replayed until the amount of replayed data plus the data in the delay buffer is greater than a frame. Since the pitch can be longer than the frame size, the added replay data can make the delay more than a frame. In this case, the taking of frames from jitter buffer 320 may be suspended, and data may be played out from DADB 406 a frame at a time until the delay is back down to a desirable level, such as less than 1 frame, for example. In the meantime, received packets may be stored in jitter buffer 320 to rebuild the frame pipeline.

When the dropping or replaying of frames is performed this way, the normal delay associated with the delay buffer is typically less than 1 frame size. To further optimize the delay associated with DADB 406, the amount of delay can be reduced during silence periods, where discarding of data is less noticeable.

Operations for the above network and systems may be further described with reference to the following figures and accompanying examples. Some of the figures may include programming logic. Although such figures presented herein may include a particular programming logic, it can be appreciated that the programming logic merely provides an example of how the general functionality described herein can be implemented. Further, the given programming logic does not necessarily have to be executed in the order presented unless otherwise indicated. In addition, the given programming logic may be implemented by a hardware element, a software element executed by a processor, or any combination thereof. The embodiments are not limited in this context.

Figure 5:
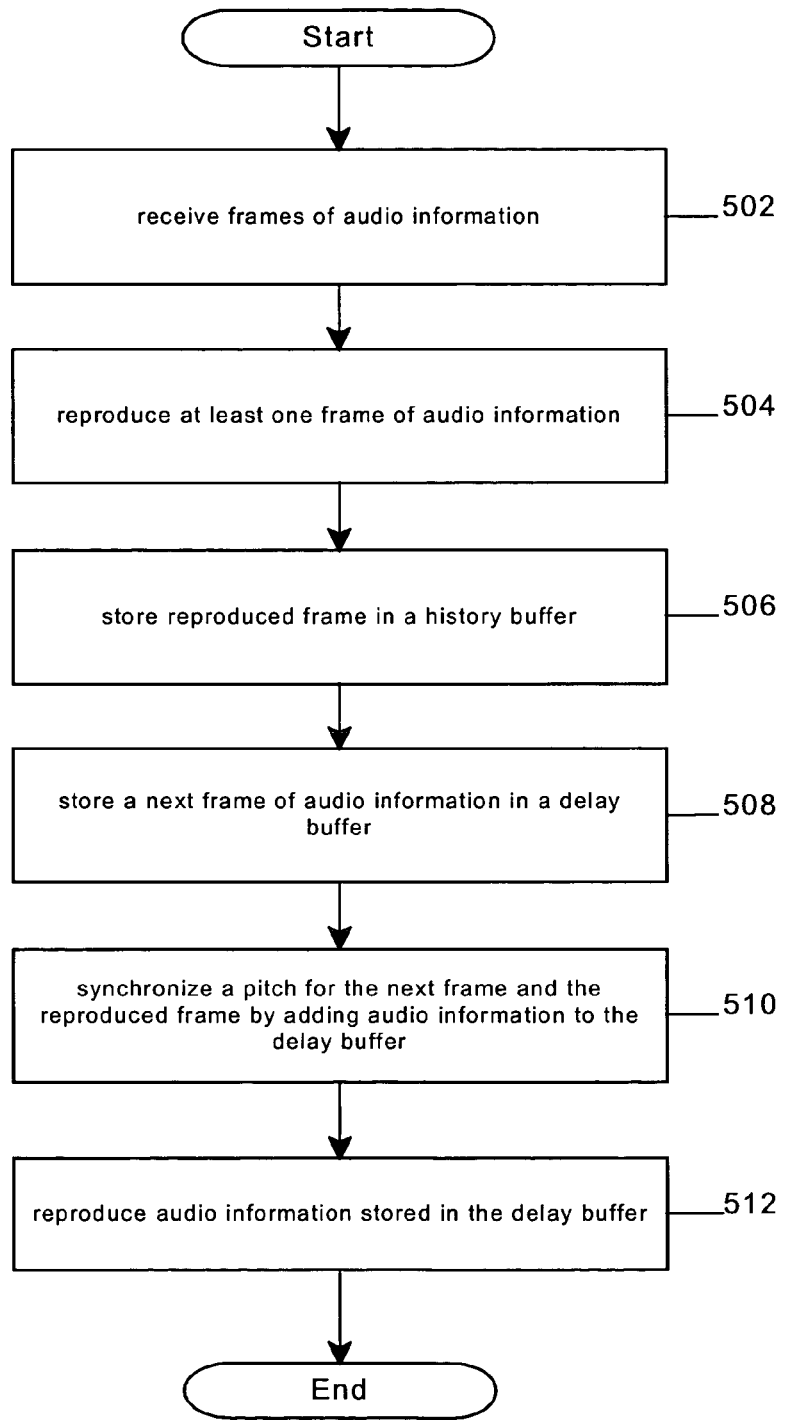
FIG. 5 illustrates a block diagram of a programming logic 500.

FIG. 5 illustrates a programming logic 500. Programming logic 500 may be representative of the operations executed by one or more systems described herein, such as JMM 124, for example. As shown in programming logic 500, frames of audio information may be received at block 502. At least one frame of audio information may be reproduced at block 504. The reproduced frame(s) may be stored in a history buffer at block 506. A next frame of audio information may be stored in a delay buffer at block 508. A pitch for the next frame and the reproduced frame(s) may be synchronized by adding audio information to the delay buffer at block 510. The audio information stored in the delay buffer may be reproduced at block 512.

In one embodiment, the frames of audio information may be received by receiving packets of encoded audio information. The packets may be stored in a jitter buffer. The packets of encoded audio information may be decoded into frames of audio information.

In one embodiment, the pitch may be synchronized by comparing a number of packets stored in a jitter buffer to a maximum threshold value and a minimum threshold value. A first signal to indicate a packet needs removal may be generated if the number of packets is equal to or more than the maximum threshold value. A second signal to indicate a reproduced frame needs replayed may be generated if the number of packets is equal to or less than the minimum threshold value.

In one embodiment, the pitch may be synchronized by receiving the first signal to indicate a packet needs removal. A pitch period may be determined from the history buffer. A number of packets having a number of frames of audio information may be removed from the jitter buffer, with the number of frames comprising a multiple of the pitch period. Audio information remaining due to fractional pitch period from a first removed frame may be stored in the delay buffer.

In one embodiment, the pitch may be synchronized by receiving the second signal to indicate audio data needs replayed. A pitch period may be determined from the history buffer. Audio information from the history buffer may be stored in the delay buffer in multiples of the pitch period.

In one embodiment, the audio information may be taken from the delay buffer by determining whether the audio information in the delay buffer is greater than a frame size. Removal of packets of audio information from the jitter buffer may be suspended if the audio information in the delay buffer is greater than the frame size. Frames of audio information may be taken from the delay buffer until the audio information in the delay buffer is less than one frame size.

Figure 6:
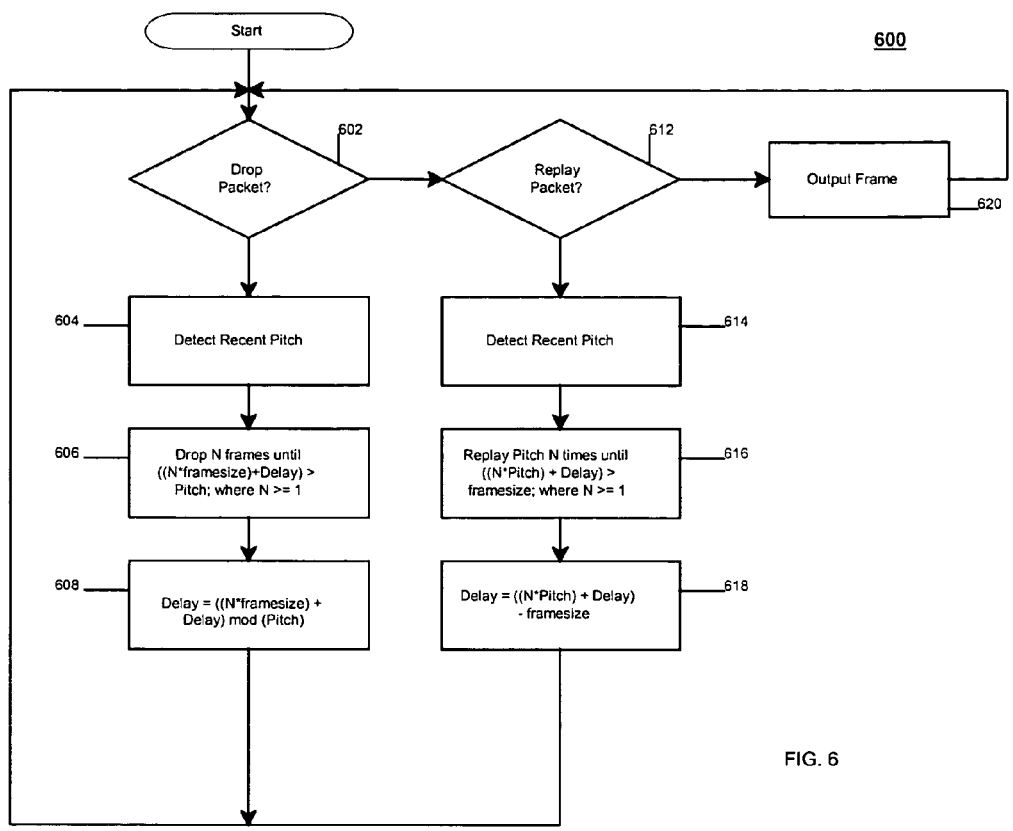
FIG. 6 illustrates a block diagram of a programming logic 600.

FIG. 6 illustrates a block diagram of a programming logic 600. Programming logic 600 illustrates a programming logic for JMM 124 in greater detail. As shown in FIG. 6, a determination may be made as to whether to drop a packet at block 602. This decision relies upon whether there is overflow condition in jitter buffer 320, which may indicate that the receive clock is slower than the transmit clock. If a packet is to be dropped at block 602, pitch detector 404 may determine a pitch period using previously reproduced audio information stored in history buffer 402 at block 604. Control module 408 may send a signal to jitter buffer 320 to drop one or more packets that are ready for transport to decoder 322 at block 606. Jitter buffer 320 may begin to drop N frames, with the number of frames dropped may be represented by Equation (1) as follows:

$$((N*framesize)+Delay)>Pitch, \text{ where } N>=1. \tag{1}$$

Audio information from a dropped frame (e.g., the first dropped frame) may be added to the output of DADB 406 at block 608. The new Delay value may be updated in accordance with Equation (2) as follows:

$$Delay=((N*framesize)+Delay) \bmod (Pitch). \tag{2}$$

For example, assume the following values of Delay=1 ms, Pitch=4 ms, framesize=10 ms, and N=1. According to Equation (2), the new Delay is 3 ms. The amount of audio information from the dropped frame to be added to the delay buffer is thus 2 ms, the difference between the old and new Delay values. The Delay value in normal operating conditions is typically less than 1 frame. If the Delay value is greater than 1 frame, requests for data from jitter buffer 320 is suspended and data from DADB 406 are played out frame-by-frame until the Delay value is less than 1 frame.

As shown in FIG. 6, if a determination is made to not drop a packet at block 602, a determination may be made as to whether to replay a previously reproduced packet at block 612. This decision relies upon whether there is underflow condition in jitter buffer 320, which may indicate that the receive clock is faster than the transmit clock. If a packet is to be replayed at block 612, pitch detector 404 may determine a pitch period using previously reproduced audio information stored in history buffer 402 at block 614. Control module 408 may send a signal to history buffer 402 to send a portion of the previously reproduced audio information to DADB 406. The amount of previously reproduced audio information sent to DADB 406 may be determined at block 616 as represented by Equation (3) as follows:

$$\text{Replay Pitch } N \text{ times until } ((N*Pitch)+Delay)>framesize, \text{ where } N>=1. \tag{3}$$

The Delay value may be updated at block 618 in accordance with Equation (4) as follows:

$$Delay=((N*Pitch)-Delay)-framesize. \tag{4}$$

For example, assume the following values are Delay=0, Pitch=4 ms, framesize=10 ms, and N=3. According to Equation (4), the new Delay is 2 ms. The remaining pitch period to be added to the delay buffer is thus 2 ms, the difference between the old and new Delay values. If a packet is not to be replayed at block 612, a frame may be output at block 620.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

It is also worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some embodiments may be implemented using an architecture that may vary in accordance with any number of factors, such as desired computational rate, power levels, heat tolerances, processing cycle budget, input data rates, output data rates, memory resources, data bus speeds and other performance constraints. For example, an embodiment may be implemented using software executed by a general-purpose or special-purpose processor. In another example, an embodiment may be implemented as dedicated hardware, such as a circuit, an application specific integrated circuit (ASIC), Programmable Logic Device (PLD) or digital signal processor (DSP), and so forth. In yet another example, an embodiment may be implemented by any combination of programmed general-purpose computer components and custom hardware components. The embodiments are not limited in this context.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

While certain features of the embodiments have been illustrated as described herein, many modifications, substitutions, changes and equivalents will now occur to those skilled in the art. It is therefore to be understood that the appended claims are intended to cover all such modifications and changes as fall within the true spirit of the embodiments.

The invention claimed is:

1. An apparatus, comprising:
a jitter buffer to store packets of encoded audio information;
a decoder to connect to said jitter buffer, said decoder to decode said encoded audio information into frames of audio information;
a pitch management module to connect to said decoder, said pitch management module having a history buffer, a pitch detector, a pitch control module, and a delay buffer, said history buffer to store at least one reproduced frame of audio information, said pitch detector to determine a pitch period from said history buffer, said delay buffer to store a next frame of audio information to be reproduced, and said pitch control module to add audio information to said delay buffer to synchronize a pitch for said next frame and said reproduced frame.

2. The apparatus of claim 1, wherein said pitch control module is to compare a number of packets stored in said jitter buffer to a maximum threshold value and a minimum threshold value, and to generate a first signal to indicate a packet needs removal from said jitter buffer if said number of packets is equal to or more than said maximum threshold value, and to generate a second signal to indicate a reproduced frame needs replayed if said number of packets is equal to or less than said minimum threshold value.

3. The apparatus of claim 1, wherein said jitter buffer is to receive a first signal to indicate a packet needs removal, said jitter buffer to remove a number of packets having a number of frames of audio information, with said number of frames comprising a multiple of said pitch period, said decoder to decode audio information from a first removed frame and to store said decoded audio information remaining due to fractional pitch period in said delay buffer.

4. The apparatus of claim 1, wherein said history buffer is to receive a second signal to indicate a reproduced frame needs replayed, and said history buffer to send audio information from said reproduced frame in multiples of said pitch period for storage in said delay buffer.

5. The apparatus of claim 1, wherein said pitch control module is to determine whether said audio information in said delay buffer is greater than a frame size, said pitch control module to send a third signal to said jitter buffer to suspend removal of packets of audio information from said jitter buffer if said audio information in said delay buffer is greater than said frame size, and said delay buffer to output frames of audio information until said audio information in said delay buffer is less than one frame size.

6. A system, comprising:
an antenna;
a receiver to connect to said antenna; and
a jitter management module to connect to said receiver, said jitter management module comprising:
a jitter buffer to store packets of encoded audio information;
a decoder to connect to said jitter buffer, said decoder to decode said encoded audio information into frames of audio information;
a pitch management module to connect to said decoder, said pitch management module having a history buffer, a pitch detector, a pitch control module, and a delay buffer, said history buffer to store at least one reproduced frame of audio information, said pitch detector to determine a pitch period from said reproduced frame, said delay buffer to store a next frame of audio information to be reproduced, and said pitch control module to add audio information to said delay buffer to synchronize a pitch for said next frame and said reproduced frame.

7. The system of claim 6, wherein said pitch control module is to compare a number of packets stored in said jitter buffer to a maximum threshold value and a minimum threshold value, and to generate a first signal to indicate a packet needs removal from said jitter buffer if said number of packets is equal to or more than said maximum threshold value, and to generate a second signal to indicate a reproduced frame needs replayed if said number of packets is equal to or less than said minimum threshold value.

8. The system of claim 6, wherein said jitter buffer is to receive a first signal to indicate a packet needs removal, said jitter buffer to remove a number of packets having a number of frames of audio information, with said number of frames comprising a multiple of said pitch period, said decoder to decode audio information from a first removed frame and to store said decoded audio information remaining due to fractional pitch period in said delay buffer.

9. The system of claim 6, wherein said history buffer is to receive a second signal to indicate a reproduced frame needs replayed, and said history buffer to send audio information from said reproduced frame in multiples of said pitch period for storage in said delay buffer.

10. The system of claim 6, wherein said pitch control module is to determine whether said audio information in said delay buffer is greater than a frame size, said pitch control module to send a third signal to said jitter buffer to suspend removal of packets of audio information from said jitter buffer if said audio information in said delay buffer is greater than said frame size, and said delay buffer to output frames of audio information until said audio information in said delay buffer is less than one frame size.

11. A method, comprising:
receiving frames of audio information;
reproducing at least one frame of audio information;
storing said reproduced frame in a history buffer;
storing a next frame of audio information in a delay buffer;
synchronizing a pitch for said next frame and said reproduced frame by adding audio information to said delay buffer; and
reproducing audio information stored in said delay buffer;
wherein said reproducing comprises:
determining whether said audio information in said delay buffer is greater than a frame size;
suspending removal of packets of audio information from a jitter buffer if said audio information in said delay buffer is greater than said frame size; and
reproducing frames of audio information from said delay buffer until said audio information in said delay buffer is less than one frame size.

12. The method of claim 11, wherein said receiving comprises:
receiving packets of encoded audio information;
storing said packets in a jitter buffer; and
decoding said packets of encoded audio information into said frames of audio information.

13. A method, comprising:
receiving frames of audio information;
reproducing at least one frame of audio information;
storing said reproduced frame in a history buffer;
storing a next frame of audio information in a delay buffer;
synchronizing a pitch for said next frame and said reproduced frame by adding audio information to said delay buffer; and
reproducing audio information stored in said delay buffer;
wherein said synchronizing comprises:
comparing a number of packets stored in a jitter buffer to a maximum threshold value and a minimum threshold value;
generating a first signal to indicate a packet needs removal if said number of packets is equal to or more than said maximum threshold value; and
generating a second signal to indicate a reproduced frame needs replayed if said number of packets is equal to or less than said minimum threshold value.

14. A method, comprising:
receiving frames of audio information;
reproducing at least one frame of audio information;
storing said reproduced frame in a history buffer;
storing a next frame of audio information in a delay buffer;
synchronizing a pitch for said next frame and said reproduced frame by adding audio information to said delay buffer; and
reproducing audio information stored in said delay buffer;
wherein said synchronizing comprises:
receiving a first signal to indicate a packet needs removal;
determining a pitch period from said reproduced frame;
removing a number of packets having a number of frames of audio information from a jitter buffer, with said number of frames comprising a multiple of said pitch period; and
storing audio information remaining due to fractional pitch period from a first removed frame in said delay buffer.

15. A method, comprising:
receiving frames of audio information;
reproducing at least one frame of audio information;
storing said reproduced frame in a history buffer;
storing a next frame of audio information in a delay buffer;
synchronizing a pitch for said next frame and said reproduced frame by adding audio information to said delay buffer; and
reproducing audio information stored in said delay buffer;
wherein said synchronizing comprises:
receiving a second signal to indicate a reproduced frame needs replayed;
determining a pitch period from said reproduced frame; and
storing audio information from said reproduced frame in multiples of said pitch period in said delay buffer.

16. An article of manufacture, comprising:
a computer-readable medium;
said computer-readable medium including stored computer executable instructions that, when executed by a computer, are operable to receive frames of audio information, reproduce at least one frame of audio information, store said reproduced frame in a history buffer, store a next frame of audio information in a delay buffer, synchronize a pitch for said next frame and said reproduced frame by adding audio information to said delay buffer, and reproduce audio information stored in said delay buffer; wherein said reproducing comprises determine whether said audio information in said delay buffer is greater than a frame size, suspend removal of packets of audio information from a jitter buffer if said audio information in said delay buffer is greater than said frame size, reproduce frames of audio information from said delay buffer until said audio information in said delay buffer is less than one frame size.

17. The article of claim 16, wherein the stored instructions, when executed by a processor, perform said receiving using stored instructions operable to receive packets of encoded audio information, store said packets in a jitter buffer, and decode said packets of encoded audio information into said frames of audio information.

18. An article of manufacture, comprising:
a computer-readable medium;
said computer-readable medium including stored computer executable instructions that, when executed by a computer, are operable to receive frames of audio information, reproduce at least one frame of audio information, store said reproduced frame in a history buffer, store a next frame of audio information in a delay buffer, synchronize a pitch for said next frame and said reproduced frame by adding audio information to said delay buffer, and reproduce audio information stored in said delay buffer; wherein said synchronizing comprises compare a number of packets stored in a jitter buffer to a maximum threshold value and a minimum threshold value, generate a first signal to indicate a packet needs removal if said number of packets is equal to or more than said maximum threshold value, generate a second signal to indicate a reproduced frame needs replayed if said number of packets is equal to or less than said minimum threshold value.

19. An article of manufacture, comprising:

a computer-readable medium;

said computer-readable medium including stored computer executable instructions that, when executed by a computer, are operable to receive frames of audio information, reproduce at least one frame of audio information, store said reproduced frame in a history buffer, store a next frame of audio information in a delay buffer, synchronize a pitch for said next frame and said reproduced frame by adding audio information to said delay buffer, and reproduce audio information stored in said delay buffer; wherein said synchronizing comprises receive a first signal to indicate a packet needs removal, determine a pitch period from said reproduced frame, remove a number of packets having a number of frames of audio information from a jitter buffer, with said number of frames to comprise a multiple of said pitch period, and store audio information remaining due to fractional pitch period from a first removed frame in said delay buffer.

20. An article of manufacture, comprising:

a computer-readable medium;

said computer-readable medium including stored computer executable instructions that, when executed by a computer, are operable to receive frames of audio information, reproduce at least one frame of audio information, store said reproduced frame in a history buffer, store a next frame of audio information in a delay buffer, synchronize a pitch for said next frame and said reproduced frame by adding audio information to said delay buffer, and reproduce audio information stored in said delay buffer; wherein said synchronizing comprises receive a second signal to indicate a reproduced frame needs replayed, determine a pitch period from said reproduced frame, and store audio information from said reproduced frame in multiples of said pitch period in said delay buffer.

* * * * *